June 28, 1932.  A. L. DE LEEUW  1,865,239
SCREW CUTTING METHOD AND MEANS
Filed Nov. 14, 1929  2 Sheets-Sheet 1
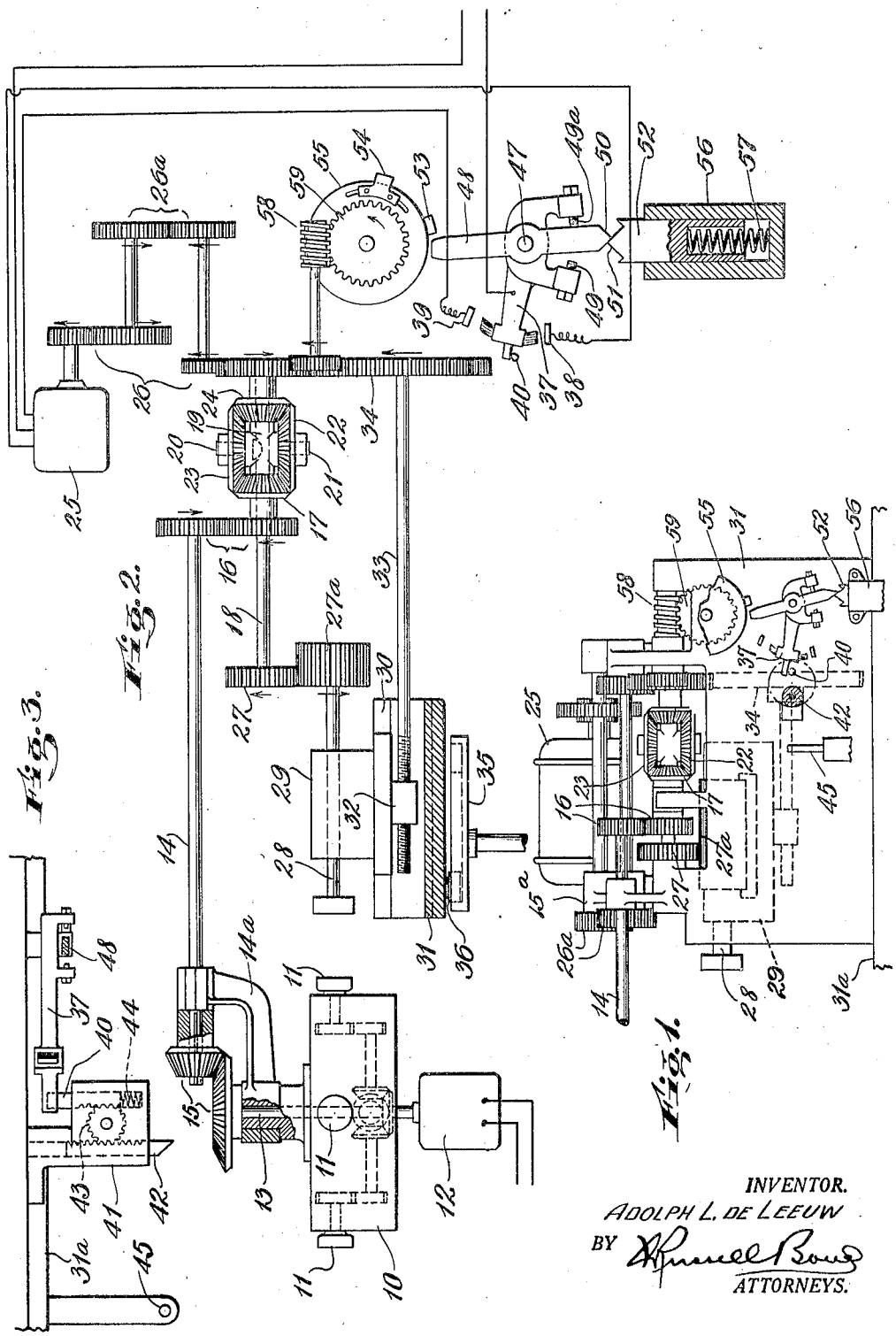
INVENTOR.
ADOLPH L. DE LEEUW
BY
ATTORNEYS.

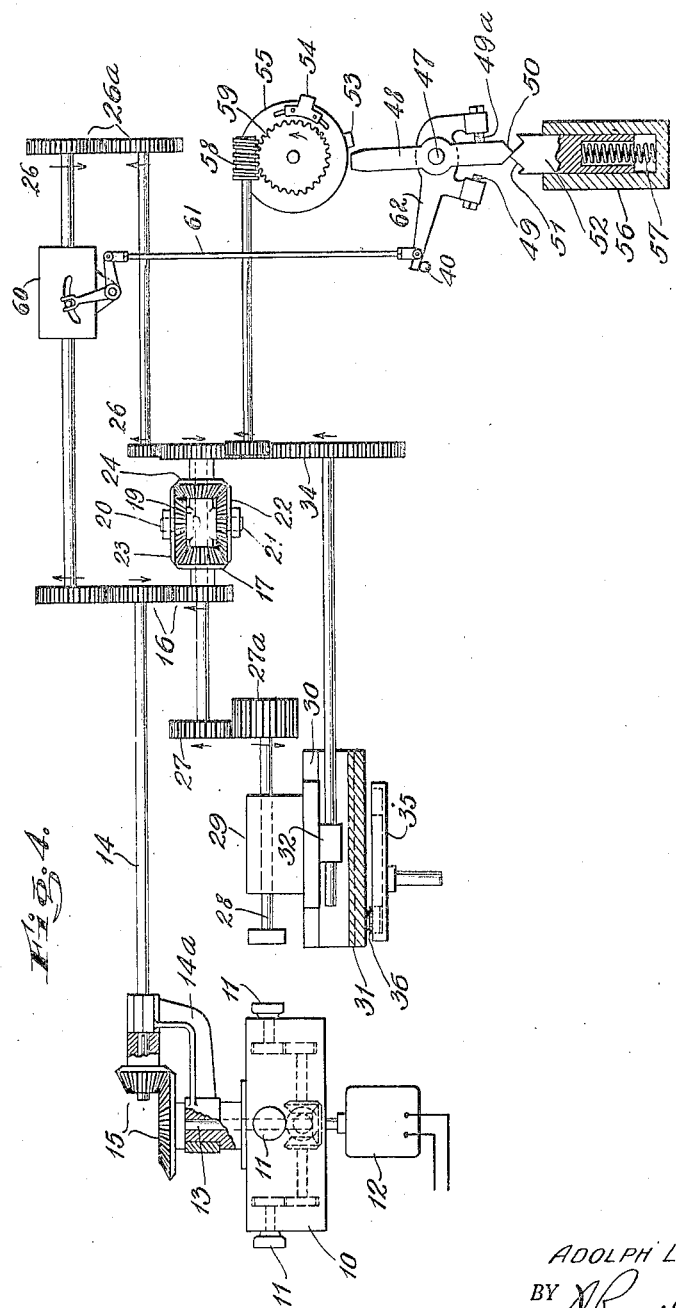

Patented June 28, 1932

1,865,239

UNITED STATES PATENT OFFICE

ADOLPH L. DE LEEUW, OF PLAINFIELD, NEW JERSEY

SCREW CUTTING METHOD AND MEANS

Application filed November 14, 1929. Serial No. 407,196.

My invention relates to a novel method of and means for controlling relative movements of two cooperating rotatable members driven by a pair of independently variable actuating means or by a common actuating means.

More particularly the invention relates to the cutting of screw threads although it may be employed in other arts as well. Thus, in a certain thread cutting method the work and the tool both rotate in the same direction, the tool turning slower than the work when cutting and faster than the work when backing off the thread or vice versa.

There are advantages in using this method of thread cutting in automatic machine tools of the type in which the work is carried by rotary spindles mounted in a turret and the latter is indexed so that each piece of work is presented successively to a series of tools one of the latter being a rotary tap or die. In large machines of this class, it is also advantageous to drive the turret spindles with one motor and to use a different motor for actuating the threading tool. However, in order to cut a perfect thread it is essential that a constant rotary speed ratio be maintained between the work and the tool during the cutting of the thread and also that a constant ratio be maintained while the tool is running off the thread, or if any variations do take place, that they be exactly compensated by corresponding variations in the feed of the tool toward and from the work. Unfortunately, it is impossible to obtain absolute synchronism between two independent motors and fluctuations in speed of either motor with respect to the other, will produce inaccuracies in the threading or will damage the thread when the tool is backing off.

It is an object of my invention to provide a method and means of control in which fluctuations of the motors will have no effect whatsoever on the accuracy of the thread cut. To this end, I rotate the work with one motor and feed the tool toward and from the work with another motor, while the tool is rotated by both of the motors through differential gearing such that fluctuations of the work-driving motor will not vary the differential rotary speed of the tool with respect to the work while fluctuations of the other motor will be exactly compensated by variations in the feed of the tool.

Another object of the invention is to provide means for reversing the tool-feeding motor to effect a reversal of feed and also a reversal of the differential rotary speed of the work and tool without reversing the rotation of either the work or the tool.

Another object of the invention is to provide automatic means for stopping the tool-feeding motor while the turret is being indexed to bring a new piece of work into position and for automatically starting said motor to thread the work and then reversing said motor to back the tool off the thread.

The manner in which these and other objects and advantages are attained will appear in the following description of two specific embodiments of my invention and the novelty and scope of the invention will thereafter be pointed out in the claims.

In the accompanying drawings;

Figure 1 is a side elevation, partially broken away, of a portion of an automatic chucking machine embodying my invention;

Fig. 2 is a diagrammatic view illustrating an arrangement of gearing employed in carrying out my invention;

Fig. 3 is a detail view of an automatic switching mechanism; and

Fig. 4 is a diagrammatic view of an arrangement of gearing in a modified form of my invention.

As shown in Fig. 2, the turret 10 of the automatic chucking machine is provided with the customary work-holding spindles 11 which are driven through suitable gearing by a motor 12. The turret is indexed in the usual manner, by means not shown, to bring each piece of work successively into threading position. The motor shaft 13 is continued upward through the turret and drives a countershaft 14 through a pair of bevel gears 15. The countershaft is journaled adjacent said gearing in a swivel bracket 14a and has spline connection with one of the bevel gears so that it may slide axially therethrough. The other end of the countershaft is journaled in a bracket 15a on a carriage 31 (Fig. 1) which is slidable on a base 31a toward and from the turret. The countershaft is operatively connected through suitable gearing 16 to a bevel pinion 17 mounted to turn freely on shaft 18 journaled on the carriage 31. The gear ratio between the motor 12 and pinion 17 is such that the speed of the will rotate at just twice the speed of the spindles 11. Keyed upon the shaft 18 is a sleeve 19 which carries a pair of diametrically opposed studs 20 and 21 on which are mounted a pair of bevel gears 22 and 23 respectively. These bevel gears mesh on one side with pinion 17 and on the other with a bevel pinion 24, also freely rotatable on the shaft 18. A motor 25 mounted on the carriage 31 drives the pinion 24 through a train of gearing 26 which includes a set of change gears 26a.

The gears 17, 22, 23 and 24 constitute a differential train or a "jack-in-the-box" as it is commonly called. By reason of this differential gearing the shaft 18 will rotate at a speed which is half the difference of the speeds of the gears 17 and 24 when said gears turn in opposite directions and half the sum of the speeds of said gears when the latter turn in the same direction. Fixed upon the shaft 18 is a gear 27 which meshes with a gear 27a secured upon a spindle 28.

The spindle 28 is adapted to carry a thread-cutting tool and is mounted in a slide block 29 which is movable in suitable ways 30 in the tool carriage 31. It will be observed that the gear 27a has a broad face to allow for the sliding of spindle 28 with respect to gear 27. The slide block carries a nut 32 which engages a lead screw 33. A spur gear 34 fixed upon the lead screw meshes with the gear train 26 so that said screw is positively driven by the motor 25. The tool carriage 31 is moved periodically toward and from the turrent in the usual manner by any suitable mechanism, such, for instance, as a cam 35 journaled in the base 31a and engaging a roller 36 on the carriage.

The motor 25 is of the reversible type and it is controlled by a double throw switch 37 which plays between contacts 38 and 39. The electric connections to the motor are such that when the switch engages the contact 39, the motor will turn the pinion 24 in the same direction as pinion 17 is turned and when the switch engages contact 38, pinion 24 will be turned in the opposite direction. The switch is normally held in neutral or open position between contacts 38 and 39, as shown in Fig. 2, by engaging a latch pin 40.

As shown in Fig. 3 the latch pin 40 slides axially in a casing 41 and is formed with rack teeth, a companion pin 42 formed with rack teeth is also mounted in the casing, and between these pins is mounted a pinion 43 which meshes with the teeth on the pins. A spring 44 urges the pin 40 outwardly into the path of the switch arm 37 and, by reason of the rack and pinion connection, also urges the pin 42 in the opposite direction, so that a beveled end of said pin will project from the opposite end of the casing. A lug 45 fixed upon the base of the machine lies in the path of the projecting end of the pin 42. When the carriage 31 moves forward or toward the turret the lug will engage the end of pin 42 and because said end is beveled will move the pin inward, thereby retracting the stop pin 40. In this position the parts will be retained until the carriage starts back and carries the pin 42 clear of the lug 45.

The switch arm 37 is mounted to turn on a pivot 47 on which is also mounted the lever 48. This lever is permitted a certain amount of play between a pair of screws 49 and 49a respectively. These screws are adjustable in a yoke extension of a switch arm 37. One end of the lever 48 terminates in a pointed tooth 50 which is normally engaged by a pointed tooth 51 formed on the end of a pin 52. The other end of the lever 48 lies in the path of a pair of dogs 53 and 54 respectively, mounted on a disk 55. The latter is driven from the gear train 26 through a worm 58 and a worm gear 59 to step down the speed of the disk. The pin 52 slides in a suitable casing 56 and is urged outward against the pointed tooth 50 of the lever 48 by a spring 57. The converging side faces of the teeth 50 and 51 are of such inclination that the spring 57 will press the arm 48 against one or the other of the screws 49, depending upon which faces of said teeth are at the moment in contact.

The operation of the mechanism is as follows: Assuming that a piece of work is mounted on a spindle 11 in the turret 10 and that a thread cutting tool is fixed upon the spindle 28, as soon as the turret has been indexed to bring said piece of work into alinement with the spindle 28, the carriage 31 is advanced by the cam 35 toward the turret in the usual manner. As the carriage nears the end of its advance movement the lug 45 withdraws the latch 40 from the switch arm 37. The latter, under the urge of the spring pressed pin 52 acting through the screw 49a will then snap into engagement with the contact 38 starting the motor 25. The latter through the gear train 26 drives the bevel pinion 24 in a reverse direction with respect to the rotation of pinion 17 and the gear ratio is so chosen that the spindle 28 will run in the same direction as the adjacent spindle 11 but at a lower speed. At the same time the lead screw 33 will feed the tool forward at a predetermined rate with respect to the rotary speed of the tool and a right hand thread will be cut in the work carried by the spindle 11. The lug 54 is adjustable on the disk 55 so that when the work has been threaded to the desired extent said lug will engage the lever 48 and swing it in the opposite direction, thereby depressing the pin 52 until the point of the tooth 50 passes the point of tooth 51. When this occurs the arm 48 will be pressed by the spring 57 against the screw 49, snapping the switch out of engagement with contact 38 and into engagement with contact 39. This reverses the motor, with the result that the spindle 28, while traveling in the same direction as the spindle 11, now turns at a speed which is as much greater than that of spindle 11 as it was formerly slower than said spindle. At the same time the lead screw is reversed and the tool is run off the work without damaging the thread previously cut. The disk 55 also turns in reverse direction and eventually the lug 53 will strike the arm 48, depressing the pin 52 until the point of tooth 50 passes the point of tooth 51, when, under the urge of spring 57, the arm 48 will engage the screw 49a and snap the switch 37 clear of the contact 39. However, the switch arm is prevented from engaging the contact 38 because in the meantime the carriage 31 is retracted by the cam 35 and as soon as the carriage started to recede the pin 41 cleared lug 42 projecting the latch pin 40 into the path of the switch arm 37.

It will be observed that the speed of the spindle 28 is a function of the speeds of the motors 12 and 25 and no matter how the speed of motor 12 varies the differential speed of spindle 11 and spindle 28 will be constant so long as the speed of motor 25 remains constant. Hence, a perfect thread will be cut although the speed of motor 12 should fluctuate widely or should even stop. When the motor 25 is reversed the same differential speed will be maintained between spindles 11 and 28, but in the opposite sense, and because the feed of the spindle 28 is also reversed the tool will run off the work without damaging the thread in the least. But it is not necessary to hold the speed of the motor 25 constant because while fluctuations of motor 25 will cause fluctuations in the speed ratio between spindles 11 and 28 these will be exactly compensated by corresponding fluctuations in the speed of the lead screw. Hence, the pitch of the thread cut in the work will remain constant and when backing the tool off, the tool will follow perfectly the thread already cut.

To take a concrete example, suppose that the spindle 11 is turned at 100 R. P. M. and the pinion 17 at 200 R. P. M., while the pinion 24 is making 40 R. P. M. in the opposite direction. The spindle 28 will then turn at half the difference of speed between pinions 17 and 24, or at 80 revolutions per minute. In other words, the spindle 28 will be turning 20 R. P. M. slower than the spindle 11. On reversing the motor 25 the spindle 28 will turn at a speed which represents the sum of the speeds of pinions 17 and 24, or 120 R. P. M., or in other words, the spindle 28 will turn 20 R. P. M. faster than the spindle 11, and hence will run off the thread cut on the work without damaging the thread in the least. If now the speed of motor 12 should be doubled so that the spindle 11 would make 200 R. P. M. and pinion 17 400 R. P. M., the speed of pinion 24 remaining at 40 R. P. M. in the opposite direction, the resultant speed of the spindle 28 would be 180 R. P. M., or still exactly 20 R. P. M. slower than spindle 11 and when the motor 25 was reversed the spindle 28 would rotate at 220 R. P. M., or again 20 R. P. M. faster than spindle 11. Let us assume that the lead screw is driven at 20 R. P. M. in order to cut a thread of desired pitch when the spindle 28 is running 20 R. P. M. slower than spindle 11. If now the speed of motor 25 is doubled, while the spindle 11 is making 100 R. P. M., the spindle 28 will turn at 60 R. P. M., or 40 R. P. M. slower than spindle 11, and when the motor 25 is reversed, the spindle 28 will run at 140 R. P. M., or 40 R. P. M. faster than the speed of spindle 11. But the lead screw which is driven directly by the motor 25 will also be running at double speed or 40 R. P. M., first in one direction and then in the other, so that the resulting thread cut will be of exactly the same pitch as in the first instance.

It will be observed, therefore, that I have provided a system of gearing by which two independently variable driving means can be combined to give a constant relation between two members driven thereby. But my invention is also applicable to conditions in which a single actuating element is used. Thus, in Fig. 4, I show an arrangement in which the motor 25 and its electrical connections are dispensed with, and the motor 12 furnishes the power for driving the spindles 28 as well as the spindles 11.

In Figs. 2 and 4 corresponding parts are designated with the same reference numerals. In the construction shown in Fig. 4 the gear train 26 including change gears 26a is driven by shaft 14 through a reversible clutch 60. This clutch is connected by a link 61 to an actuating arm 62. The latter is substituted for the switch arm 37 and is normally held in neutral position, by the latch pin 40. When the latch pin is withdrawn the arm 62 drops under impulse of spring 57 and the clutch 60 is thrown in, causing gear 24 to run reversely with respect to gear 17. When the lug 54 strikes the arm 48 and the arm 62 is thrown upward, the clutch is reversed, and the gear 24 then rotates in the same direction as the rotation of gear 17.

At first thought it might be considered unnecessary to employ a differential gearing between the work and tool spindles because since they are driven by a single motor there will be no problem of synchronizing one with the other. However, the spindle 28 is not fed constantly in the same direction, but must be stopped and reversed when the thread is finished, and as the axial feed of the spindle is slowing down to a stop and then accelerating in the opposite direction, the rotary speed of the spindle must be varied in perfect step with the variation in axial feed.

My invention provides a very convenient means of maintaining this desired relation between the spindle 28 and spindle 11 although the rotary and axial feed of spindle 28 is not constant. To state the matter in a different way my invention provides means for discounting the rotation of spindle 11 or virtually arresting its rotation. The gearing is such that when the gear 24 is held stationary spindles 11 and 28 rotate at exactly the same speed or in other words spindle 11 is stationary with respect to spindle 28. Then the rotation and feed of spindle 28 with respect to the relatively stationary spindle 11 is controlled solely by the gear 24.

In the drawings the differential driving gear 17 is pictured as running at twice the speed of spindle 11, but any gear ratio may be maintained between spindle 11 and gear 17 so long as the spindle 28 is so geared to the differential shaft 18 as to run at exactly the same speed as spindle 11 when the differential driving gear 24 is held stationary. Then to cut a thread in the work it is merely necessary to actuate the gear 24 so that the spindle 28 is turning at a different speed from that of spindle 11 while the tool is advancing with respect to the work. Obviously the tool may be held in either one of the spindles and the work in the other spindle.

It will be understood that the particular embodiments of my invention described above are to be taken as illustrative and not limitative of the scope of my invention, and that I am at liberty to make such changes in form, construction, arrangement of parts, and mode of operation, as fall within the definition of the following claims.

I claim:

1. The method of controlling the relative movement of two rotatable members in a mechanical system comprising said members and a pair of driving elements, which consists in rotating one of the members by means of one of the driving elements, causing relative axial movement of said members by means of the other of the driving elements, and differentially rotating the other of the rotary members by both of the driving elements.

2. The method of controlling the relative movement of two rotatable members in a mechanical system comprising said members and a pair of independently variable driving elements, which consists in rotating one of the members by means of one of the driving elements, causing relative axial movement of said members by means of a separate driving element, and differentially rotating the other of the rotary members by both of the driving elements.

3. The method of controlling the relative movement of two rotatable members in a mechanical system comprising said members and a pair of driving elements, which consists in rotating one of the members by means of one of the driving elements, causing relative axial feed of the other of said members by the other of said driving elements, periodically reversing the latter element to reverse said axial feed, and differentially rotating the other of the rotary members by both of the driving elements in such ratio that when said other driving element is held stationary the two rotary members will rotate at the same speed.

4. The method of controlling the relative movement of two rotatable members in a mechanical system comprising said members and a pair of independently variable driving elements, which consists in rotating one of the members by means of one of the driving elements, causing relative axial feed of the other of said members by the other of said driving elements, periodically reversing the latter element to reverse said axial feed, and differentially rotating the other of the rotary members by both of the driving elements in such ratio that when said other driving element is held stationary the two rotary members will rotate at the same speed.

5. In combination, a spindle mounted to rotate, a driving element for rotating said spindle, a second spindle, mechanism for effecting relative axial movement of said spindles, a second driving element for actuating said mechanism, and a driving means differentially actuated by both of said driving elements for rotating the second spindle.

6. In combination, a pair of motors, a spindle driven by one of the motors, a differential gearing, a second spindle driven by both of the motors through said differential gearing, and means driven by the other of said motors for advancing the second spindle toward the first spindle.

7. In combination, a pair of motors, a spindle driven by one of the motors, a differential gearing, a second spindle driven by both of the motors through said differential gearing, and means driven by the other of said motors for advancing the second spindle toward the first, said means including a lead screw and a nut engaging the lead screw.

8. In combination, a pair of motors, a spindle driven by one of the motors, a differential gearing, a second spindle driven by both of the motors through said differential gearing, a slide block in which the second spindle is mounted, a nut on the slide block, and a lead screw engaging the nut and driven by the other of said motors.

9. In combination, a pair of motors, a spindle rotated by one of the motors, a second spindle movable toward and from the first spindle, means actuated by the other of the motors for moving said second spindle toward and from the first spindle, and means for rotating the second spindle at a speed differentially controlled by both motors.

10. In combination, a pair of motors, a spindle driven by one of the motors, a differential gearing, a second spindle rotated by both motors through said differential gearing at such gear ratio that when the other of the motors is stationary the two spindles will rotate at the same speed, means driven by said other motor for moving the second spindle axially with respect to the first spindle, and means for reversing rotation of said other motor.

11. In combination, a pair of motors, a spindle driven by one of the motors, a differential gearing, a second spindle rotated by both motors through said differential gearing at such gear ratio that when the other of the motors is stationary the two spindles will rotate at the same speed, means driven by said other motor for moving the second spindle axially with respect to the first spindle, means for reversing rotation of said other motor, and means controlled by the axial movement of the second spindle for reversing said other motor.

12. In combination, a pair of motors, a spindle driven by one of the motors, a differential gearing, a second spindle rotated by both motors through said differential gearing at such gear ratio that when the other of the motors is stationary the two spindles will rotate at the same speed, means driven by said other motor for moving the second spindle axially with respect to the first spindle, means for reversing rotation of said other motor, and adjustable means controlled by the axial movement of the second spindle for reversing said other motor.

13. In combination, a pair of motors, a spindle driven by one of the motors, a differential gearing, a second spindle driven by both of the motors through said differential gearing, a slide block in which the second spindle is mounted, means actuated by the other of said motors for moving the slide block to advance the second spindle toward the first spindle, and adjustable means controlled by movement of the slide block for reversing said other motor.

14. In combination, a pair of driving gears, a driven element differentially driven by said gears, a spindle operatively connected to said driven element, another spindle operatively connected to one of the driving gears, the gear ratio between the spindles being such that when the latter driving gear is rotated and the other of the driving gears is stationary the two spindles will rotate at the same speed, and means operatively connected to said other gear for effecting relative axial movement of the spindles.

15. In combination, a pair of driving gears, means for rotating the same, a driven element differentially driven by said gears, a spindle driven by one of the gears, means for reversing rotation of the other of the gears, a second spindle geared to the driven element in such ratio that the two spindles will rotate at the same speed when the reversible gear is held stationary, and means driven by the reversible gear for effecting relative axial movement of the spindles.

16. In combination, a pair of driving gears, means for rotating the same, a driven element differentially driven by said gears, a spindle driven by one of the gears, means for reversing rotation of the other of the gears, a second spindle axially alined with the first named spindle and geared to the driven element in such ratio that the two spindles will rotate at the same speed when the reversible gear is held stationary, and means geared to the reversing gear for feeding said second spindle axially.

17. In combination, a pair of driving gears, means for rotating the same, a driven element differentially driven by said gears, a spindle driven by one of the gears, means for reversing rotation of the other of the gears, a second spindle axially alined with the first named spindle and geared to the driven element in such ratio that the two spindles will rotate at the same speed when the reversible gear is held stationary, means geared to the reversing gear for feeding said second spindle axially, and means controlled by such axial feed of the second spindle for operating said reversing means.

18. In combination, a pair of motors, a spindle driven by one of the motors, a differential gearing, a second spindle by both of the motors through said differential gearing, a slide block in which the second spindle is mounted, a nut on the slide block, a lead screw engaging the nut and driven by the other of said motors, a switch for reversing the rotation of said other motor, a member geared to said lead screw, lugs carried by said member and adapted respectively to throw said switch in opposite directions, and means for adjusting the position of one of the lugs on said member.

19. In combination, a spindle, a motor adapted to rotate the same, a second spindle axially alined with the first spindle, means for feeding the second spindle toward and from the first spindle, a reversible motor adapted to actuate the feeding means, means for rotating the second spindle differentially by both of said motors, a reversing switch for controlling the reversible motor, automatic means for reversing said switch after the second spindle has advanced a predetermined distance, means for returning the switch after the second spindle has been retracted to a predetermined position, and means for arresting the switch in a neutral position to stop the reversible motor.

20. The method of maintaining a relative helical movement of two members at a constant curvature, which consists in imparting rotary motion to one of the members, imparting a rotary motion to the other member, simultaneously imparting relative axial motion to said members, two of said motions being relatively variable, and modifying the remaining motion in differential ratio to the two relatively variable motions.

21. In combination, two spindles, means for rotating one of the spindles, means for rotating the other spindle, means for causing relative axial motion of said spindles, one of said means comprising a driving motor, another of said means comprising a second driving motor, and the remaining means comprising a set of gears differentially driven by both of said motors.

22. In combination, a spindle mounted to rotate, a second spindle mounted for rotary motion and axial motion, a driving means for rotating the first spindle, an independent driving means for imparting one of said motions to the second spindle, and means differentially actuated by both of said driving means for imparting the other of said motions to said second spindle.

In testimony whereof, I have signed this specification.

ADOLPH L. DE LEEUW.